(12) United States Patent
Ito (10) Patent No.: US 10,850,567 B2
(45) Date of Patent: Dec. 1, 2020

(54) TIRE

(71) Applicant: BRIDGESTONE CORPORATION, Tokyo (JP)

(72) Inventor: Masafumi Ito, Kokubunji (JP)

(73) Assignee: BRIDGESTONE CORPORATION, Tokyo (JP)

( * ) Notice: Subject to any disclaimer, the term of this patent is extended or adjusted under 35 U.S.C. 154(b) by 1059 days.

(21) Appl. No.: 14/773,477

(22) PCT Filed: Apr. 24, 2014

(86) PCT No.: PCT/JP2014/002320
§ 371 (c)(1),
(2) Date: Sep. 8, 2015

(87) PCT Pub. No.: WO2014/174851
PCT Pub. Date: Oct. 30, 2014

(65) Prior Publication Data
US 2016/0016437 A1 Jan. 21, 2016

(30) Foreign Application Priority Data

Apr. 24, 2013 (JP) .................. 2013-091648
Apr. 24, 2013 (JP) .................. 2013-091654

(51) Int. Cl.
*B60C 11/11* (2006.01)
*B60C 11/03* (2006.01)
(Continued)

(52) U.S. Cl.
CPC ...... *B60C 11/0306* (2013.01); *B60C 11/0008* (2013.01); *B60C 11/11* (2013.01);
(Continued)

(58) Field of Classification Search
CPC ............ B60C 2200/10; B60C 2200/14; B60C 11/0008; B60C 11/0306; B60C 11/11; B60C 11/1376; B60C 2011/0016
See application file for complete search history.

(56) References Cited

U.S. PATENT DOCUMENTS 3,578,053 A     5/1971   Milliken
5,957,180 A  *  9/1999   Kuramochi ............. B60C 11/12
                                                  152/209.21
(Continued)

FOREIGN PATENT DOCUMENTS

DE          2804939 A1    8/1979
JP         58089404 U  *  6/1983
(Continued)

OTHER PUBLICATIONS

Machine translation of JP2001-187520 (no date).*
(Continued)

*Primary Examiner* — Steven D Maki
*Assistant Examiner* — Philip N Schwartz
(74) *Attorney, Agent, or Firm* — Kenja IP Law PC (57) ABSTRACT

This tire improves high traction performance over an extended period of time and/or improves control performance while maintaining traction performance. This tire includes a tread with blocks formed thereon, protrusions (11, 21, 31) extending outward in the tire radial direction and formed on more than one of the blocks, and stepped portions (12, 22) and/or a second concavity (24) formed on a side of the protrusions (11, 21, 31).

9 Claims, 3 Drawing Sheets

(51) Int. Cl.
*B60C 11/13* (2006.01)
*B60C 11/00* (2006.01)

(52) U.S. Cl.
CPC ... *B60C 11/1376* (2013.01); *B60C 2011/0016* (2013.01); *B60C 2200/10* (2013.01); *B60C 2200/14* (2013.01)

(56) References Cited

U.S. PATENT DOCUMENTS

| | | | |
|---|---|---|---|
| 2008/0283167 A1* | 11/2008 | Matsumura | B60C 11/0083 |
| | | | 152/209.11 |
| 2010/0000643 A1 | 1/2010 | Minoli et al. | |
| 2011/0024009 A1* | 3/2011 | Nakamura | B60C 11/11 |
| | | | 152/209.1 |
| 2011/0308681 A1* | 12/2011 | Nakamura | B60C 11/032 |
| | | | 152/209.18 |
| 2012/0024443 A1* | 2/2012 | Ishida | B60C 11/11 |
| | | | 152/209.18 |

FOREIGN PATENT DOCUMENTS

| | | | | | |
|---|---|---|---|---|---|
| JP | 2000211321 A | * | 8/2000 | | B60C 11/125 |
| JP | 2001187520 A | * | 7/2001 | | B60C 11/1384 |
| JP | 2006-218948 A | | 8/2006 | | |
| JP | 2008-279996 A | | 11/2008 | | |
| JP | 2009-196425 A | | 9/2009 | | |
| JP | 2010-143370 A | | 7/2010 | | |
| JP | 2010-188931 A | | 9/2010 | | |
| JP | 2011-521845 A | | 7/2011 | | |
| JP | 2012-011916 A | | 1/2012 | | |
| JP | 2012-011953 A | | 1/2012 | | |
| JP | 2012-030615 A | | 2/2012 | | |
| JP | 2012-030658 A | | 2/2012 | | |
| JP | 2012-056479 A | | 3/2012 | | |
| JP | 2012-126363 A | | 7/2012 | | |
| JP | 2013-060075 A | | 4/2013 | | |
| JP | 5182455 B1 | | 4/2013 | | |
| WO | 2013/009314 A1 | | 1/2013 | | |

OTHER PUBLICATIONS

Machine translation of JP2000-211321 (no date).*
Jun. 17, 2014 International Search Report issued in International Patent Application No. PCT/JP2014/002320.
Jan. 7, 2014, Notification of Reasons for Refusal issued by the Japan Patent Office in the corresponding Japanese Patent Application No. 2013-091654.

* cited by examiner

TIRE

TECHNICAL FIELD

This disclosure relates to a tire provided with a tread on which a plurality of blocks is formed, with a protrusion extending outward in the tire radial direction being formed on at least some of the blocks.

BACKGROUND

The formation of protrusions on the tread surface of blocks is a known technique in motorcycle tires designed to be driven on irregular terrain, in particular muddy terrain (for example, see JP 2009-196425 A (PTL 1)). According to this technique, traction performance can be improved by increasing the edge effect with the protrusions.

CITATION LIST

Patent Literature

PTL 1: JP 2009-196425 A

SUMMARY

Technical Problem

In a tire such as the one described above, ground contact pressure concentrates at the edges of the protrusion when driving, causing the edges to wear and become rounded. The edge effect of the protrusions thus degrades, and the improvement in traction performance can no longer be expected. In a conventional tire in which protrusions are formed on the tread surface of the blocks, it has thus been difficult to improve the traction performance over an extended period of time.

Furthermore, in order to improve control performance, it is necessary to improve ground contact performance. One approach for improving ground contact performance would be to reduce the size of the protrusions formed on the tread surface of the blocks, thereby reducing the rigidity of the protrusions and making it easier for the tread surface of the protrusions to deform. By reducing the size of the protrusions, however, the edge effect achieved by the protrusions is reduced, which may result in diminished traction performance. Hence, it has been difficult to improve control performance while maintaining traction performance.

It could therefore be helpful to provide a technique that improves high traction performance over an extended period of time and a technique that can improve control performance while maintaining traction performance.

Solution to Problem

A tire according to one of the embodiments includes a tread with a plurality of blocks formed thereon; a protrusion extending outward in a tire radial direction and formed on more than one block among the plurality of blocks; and a stepped portion formed on a side of the protrusion.

A tire according to another one of the embodiments includes a tread with a plurality of blocks formed thereon; a protrusion extending outward in a tire radial direction and formed on more than one block among the plurality of blocks; and a second concavity formed on a tread surface of the protrusion.

Advantageous Effect

The disclosed tires improve high traction performance over an extended period of time and/or improve control performance while maintaining traction performance.

DETAILED DESCRIPTION

Embodiments of my tire will be described below with reference to the drawings.

Figure 1:
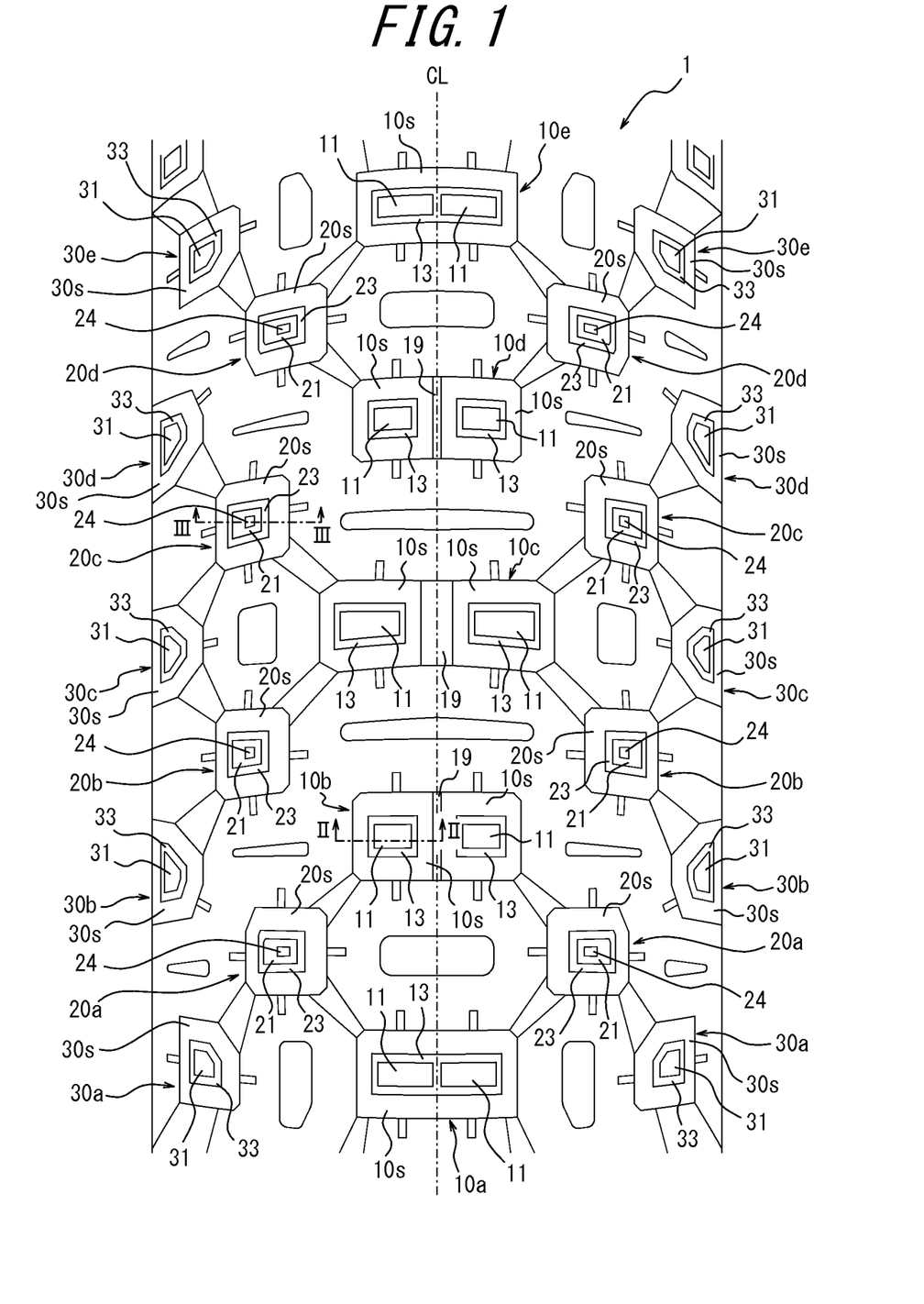
FIG. 1 is a partial plan view illustrating a tire according to one of the embodiments.

The tire according to one of the embodiments illustrated in FIG. 1 is a motorcycle tire in which a center block row is formed by a first center block 10a, a second center block 10b, a third center block 10c, a fourth center block 10d, and a fifth center block 10e disposed at intervals along the tire circumferential direction, near the tire equatorial plane CL of the tread.

On both sides of the center block row in the tire width direction, an intermediate block row is formed by a first intermediate block 20a, a second intermediate block 20b, a third intermediate block 20c, and a fourth intermediate block 20d disposed at intervals along the tire circumferential direction.

Furthermore, on both sides of the intermediate block rows in the tire width direction, a shoulder block row is formed by a first shoulder block 30a, a second shoulder block 30b, a third shoulder block 30c, a fourth shoulder block 30d, and a fifth shoulder block 30e disposed at intervals along the tire circumferential direction.

The first to fifth center blocks 10a to 10e each have an approximately rectangular shape, with the long sides along the tire width direction. At the tire widthwise center of the second to fourth center blocks 10b to 10d, a shallow groove 19 that is relatively wide and extends in the tire circumferential direction is formed. The depth of the shallow groove 19 in the tire radial direction is less than the height of the first to fifth center blocks 10a to 10e in the tire radial direction.

Figure 2:
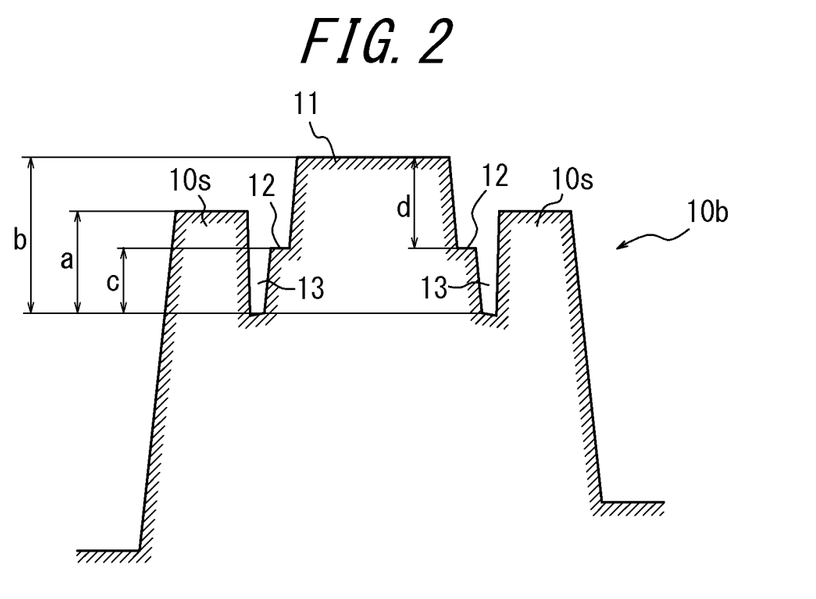
FIG. 2 is a cross-sectional diagram in the tire width direction along the line II-II of the tire in FIG. 1.
Figure 3:
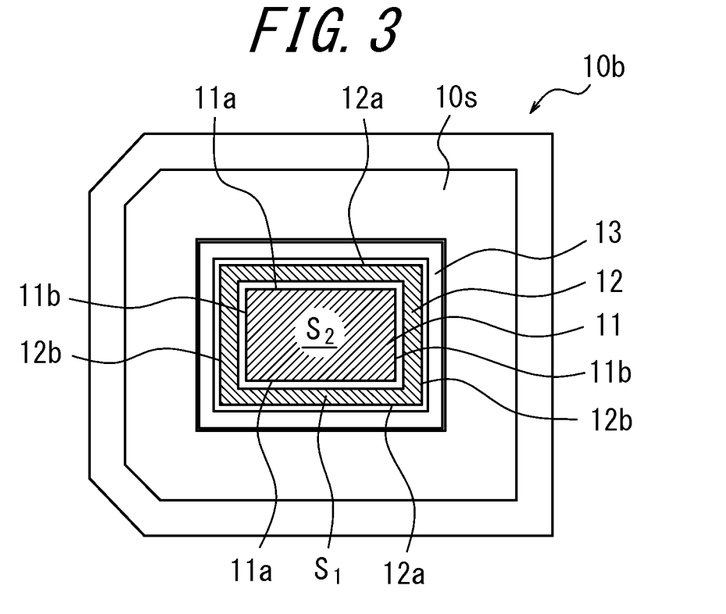
FIG. 3 is an expanded view of the area around a protrusion formed on the center block of the tire in FIG. 1.

A protrusion 11 that is rectangular in plan view of the tread is formed on both sides of the tire widthwise center of the tread surface in the first to fifth center blocks 10a to 10e, as illustrated in FIG. 1, and in FIG. 2 with respect to the second center block 10b. As illustrated in FIGS. 2 and 3, a stepped portion 12 having a rectangular perimeter in plan view of the tread is formed on at least a portion of the side of the protrusion 11. A protrusion 21 and a stepped portion 22 are also formed on the third intermediate block 20c, described below with reference to FIGS. 4 and 5. As illustrated in FIGS. 1 to 3, a first concavity 13 is disposed between two protrusions 11 of the first and fifth center blocks 10a and 10e and around the protrusions 11. A block peripheral portion 10s is formed around the first concavity 13. The first concavity 13 is a groove between the two protrusions 11 and the block peripheral portion 10s. In the second to fourth center blocks 10b to 10d, the first concavity 13 is formed around each of the two protrusions 11, and the block peripheral portion 10s is formed around each first concavity 13. The first concavity 13 is a groove between each of the protrusions 11 and the block peripheral portion 10s.

The "tread surface" as used in this disclosure refers to the surface that faces outward in the tire radial direction and can contact the ground when the tire is used.

The "protrusion" of a block as used in this disclosure refers to a portion that projects further outward in the tire radial direction than the surrounding area. The "first concavity" and the "second concavity" refer to portions that are recessed in the tire radial direction from their surroundings.

In this disclosure, the "block peripheral portion" in the blocks on which the protrusions are formed refers to a portion of the block excluding the following: the protrusion, which includes the stepped portion (in the case of the stepped portion being formed) and the second concavity (in the case of the below-described second concavity being formed), the portion inward in the tire radial direction from the protrusion, and the portion inward in the tire radial direction from the first concavity (in the case of the first concavity being formed).

As illustrated in FIG. 1, in plan view of the tread, the perimeter of the tread surface of the protrusion 11 and the perimeter of the stepped portion 12 in the first to fifth center blocks 10a to 10e each have sides extending in the tire width direction and sides extending in the tire circumferential direction.

As illustrated in FIGS. 1 to 3, corners (edges) are formed on the outer perimeter and inner perimeter of the block peripheral portion 10s, the perimeter of the stepped portion 12, and the perimeter of the tread surface of the protrusion 11 in the first to fifth center blocks 10a to 10e. The same is true for the shoulder block rows.

While not illustrated, two or more stepped portions may be provided on at least a portion of the side of the protrusion in any of the blocks.

Figure 4:
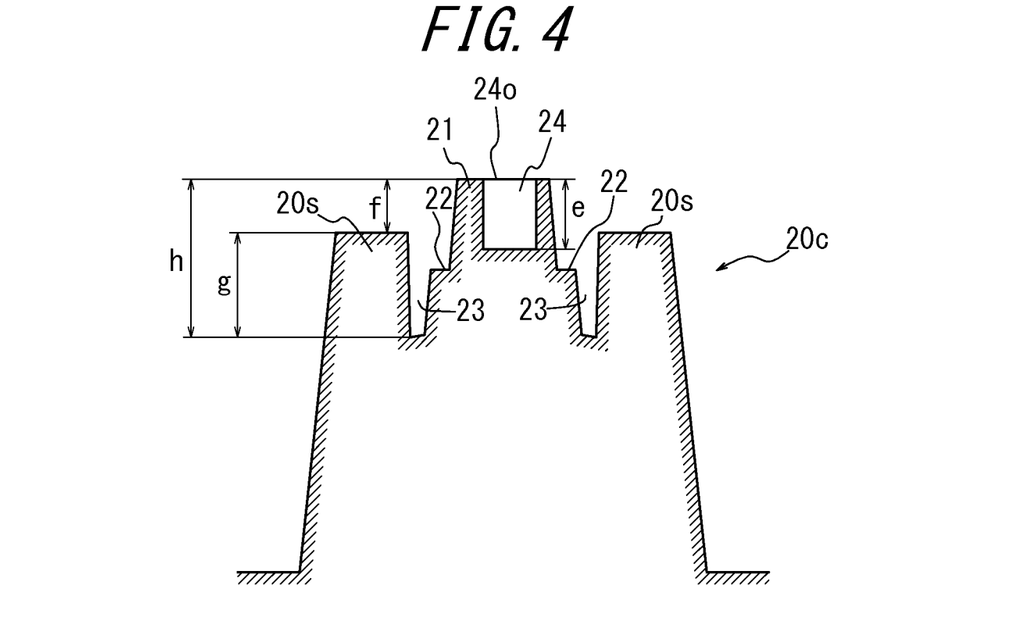
FIG. 4 is a cross-sectional diagram in the tire width direction along the line III-III of the tire in FIG. 1.
Figure 5:
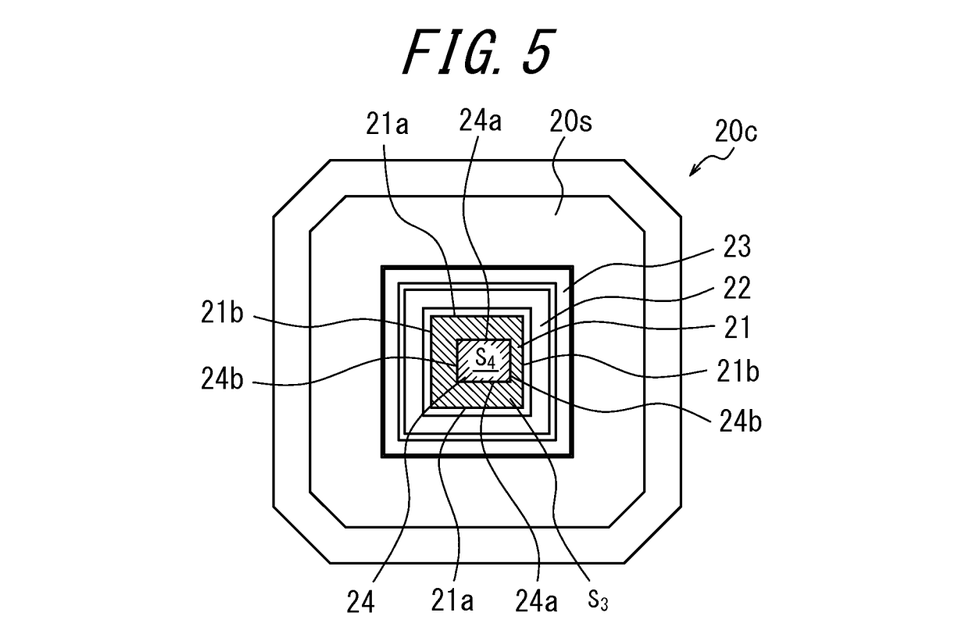
FIG. 5 is an expanded view of the area around a protrusion formed on an intermediate block of the tire in FIG. 1.

As illustrated in FIG. 1, the first to fourth intermediate blocks 20a to 20d are formed to be smaller than each of the first to fifth center blocks 10a to 10e and are roughly rectangular in plan view of the tread. As illustrated in FIG. 1, and in FIGS. 4 and 5 with respect to the third intermediate block 20c, a protrusion 21 that is rectangular in plan view of the tread is formed on the first to fourth intermediate blocks 20a to 20d. In the center of the protrusion 21, a second concavity 24 is formed with a depth in the tire radial direction of, for example, 1.5 mm. As illustrated in FIGS. 4 and 5, a stepped portion 22 having a rectangular perimeter in plan view of the tread is formed on at least a portion of the side of the protrusion 21. A first concavity 23 is formed around the protrusion 21, and a block peripheral portion 20s is formed around the first concavity 23. As illustrated in FIG. 1, in plan view of the tread, the perimeter of the tread surface of the protrusion 21 and the perimeter of the stepped portion 22 in the first to fourth intermediate blocks 20a to 20d each have sides extending in the tire width direction and sides extending in the tire circumferential direction.

As illustrated in FIGS. 1, 4, and 5, corners (edges) are formed on the outer perimeter and inner perimeter of the block peripheral portion 20s, the perimeter of the stepped portion 22, the perimeter of the tread surface of the protrusion 21, and the perimeter of the (virtual) opening 24o of the second concavity 24 in the first to fourth intermediate blocks 20a to 20d.

As illustrated in FIG. 1, the first to fifth shoulder blocks 30a to 30e are hexagonal in plan view of the tread. A protrusion 31 is formed in each of the first to fifth shoulder blocks 30a to 30e. While not illustrated, a stepped portion similar to the above-described stepped portion 12 is formed on at least a portion of the side of the protrusion 31. A first concavity 33 is formed around the protrusion 31, and a block peripheral portion 30s is formed around the first concavity 33. In plan view of the tread, both the perimeter of the tread surface of the protrusion 31 and the perimeter of the stepped portion in the first to fifth shoulder blocks 30a and 30e have an approximately similar shape as the shape of the perimeter of the block.

Next, the behavior of the blocks when the tire is used is described, taking the second center block 10b as an example. The other blocks exhibit similar behavior.

In the tire of this embodiment, the protrusion 11 and the block peripheral portion 10s contact the ground when the tire is new. Therefore, both the edges of the protrusion 11 and the edges of the block peripheral portion 10s achieve an edge effect, in particular when driving on irregular terrain. As illustrated in FIG. 2, setting a and b so that $$-2 \text{ mm} \leq a-b < 2 \text{ mm}$$

where a is the height of the tread surface of the block peripheral portion 10s and b is the height of the tread surface of the protrusion 11 is preferable, in that both the protrusion 11 and the block peripheral portion 10s contact the ground.

In this disclosure, the "height" of the stepped portion in the protrusion and the "height" of the tread surface of the block peripheral portion and the protrusion refer to the height in the tire radial direction from the base end of the protrusion.

Next, as the tire is driven, the edges of the protrusion 11 and the edges of the block peripheral portion 10s wear and become rounded due to ground contact pressure, and the height a of the tread surface of the block peripheral portion 10s and the height b of the tread surface of the protrusion 11 illustrated in FIG. 2 gradually decrease.

As the above-described wear progresses, the height a of the tread surface of the block peripheral portion 10s becomes equal to or less than the height c of the stepped portion 12 formed on the side of the protrusion 11, and the stepped portion 12 ends up positioned further outward in the tire radial direction than the tread surface of the block peripheral portion 10s. As a result, the edges of the stepped portion 12 begin to achieve an edge effect.

In other words, after wear of the block progresses, the edge effect of the edges of the protrusion 11 and the edges of the block peripheral portion 10s diminishes, since these edges wear and become rounded, whereas the unworn edges of the stepped portion 12 newly achieve a large edge effect. Therefore, the edge effect is maintained even as the block wears, thereby improving the traction performance over an extended period of time.

By providing the stepped portion 12 as in this embodiment at least in the block row that is closest to the tire equatorial plane CL (center block row), which is the region where the ground contact pressure is highest, the stepped portion 12 can achieve higher traction performance.

In this embodiment, as illustrated in FIGS. 1 to 3, the first concavity 13 is formed between the protrusion 11 and the block peripheral portion 10s, adjacent to the protrusion 11. As a result, an edge effect can be achieved at the inner perimeter of the block peripheral portion 10s, improving the traction performance. Furthermore, the protrusion 11 moves more easily and follows the shape of the road, thereby improving the ground contact performance and the control performance.

The height c of the stepped portion 12 in the protrusion 11 is more preferably smaller than the height d from the stepped portion 12 to the tread surface of the protrusion 11. By thus providing the stepped portion 12 at a low position, the rigidity of the protrusion 11 can be decreased further, thereby further improving the ground contact performance.

Furthermore, by setting the height c of the stepped portion 12 in the protrusion 11 to be lower than the height a of the tread surface of the block peripheral portion 10s, wear to the edges of the stepped portion 12 is suppressed until wear of the protrusion 11 progresses, and after wear of the protrusion 11 progresses, the stepped portion 12 achieves a great edge effect, thus maintaining the traction performance. Note that c may, for example, be from 1 mm to 2 mm, and a-c may, for example, be approximately 1 mm.

As illustrated in FIG. 3, in plan view of the tread, the perimeter of the tread surface of the protrusion 11 is preferably shaped as a polygon (a rectangle in FIG. 3) having sides 11a extending in the tire width direction and sides 11b extending in the tire circumferential direction, and the perimeter of the stepped portion 12 is preferably shaped as a polygon (a rectangle in FIG. 3) having sides 12a extending in the tire width direction and sides 12b extending in the tire circumferential direction.

In this case, in plan view of the tread, the edge effect can be improved by adopting a polygon for the shape of the perimeter of the tread surface of the protrusion 11 and the perimeter of the stepped portion 12. Providing these perimeters with sides extending in the tire width direction improves traction performance when driving in a straight line. Furthermore, providing these perimeters with sides extending in the tire circumferential direction improves traction performance when turning.

Here, the area $S_1$ of the upper surface of the stepped portion 12 (the region with diagonal lines extending to the lower right in FIG. 3) is preferably less than the area $S_2$ of the tread surface of the protrusion 11 (the region with diagonal lines extending to the upper right in FIG. 3).

In this case, sufficiently securing the area of the tread surface of the protrusion 11 not only guarantees ground contact performance and control performance, but also ensures the rigidity of the protrusion 11 and guarantees traction performance.

Next, the behavior of the third intermediate block 20c is described. Note that blocks having a protrusion formed thereon, with a second concavity formed on the tread surface of the protrusion, exhibit similar behavior.

In the tire of this embodiment, the protrusion 21 and the block peripheral portion 20s contact the ground when the tire is used. Therefore, both the edges of the protrusion 21 and the edges of the block peripheral portion 20s achieve an edge effect, in particular when driving on irregular terrain, thereby improving traction performance.

The second concavity 24 is formed on the tread surface of the protrusion 21. As a result, the rigidity of the tread surface of the protrusion 21 decreases as compared to when the second concavity 24 is not formed on the tread surface of the protrusion 21. Therefore, in particular on a hard road surface, the tread surface of the protrusion 21 can follow the shape of the road surface more easily, improving ground contact performance and thereby improving control performance.

By providing the second concavity 24, the area of the tread surface of the protrusion 21 decreases. In general, as the area of the tread surface decreases, the ground contact performance diminishes, and the control performance also diminishes. The above-described effect of increasing the ground contact performance of the protrusion 21 and improving the control performance by forming the second concavity 24 in the protrusion 21, however, exceeds the reduction in control performance due to the reduction in area of the tread surface of the protrusion 21. As a result, the control performance can be improved.

As described above, by providing the second concavity 24, the rigidity of the tread surface of the protrusion 21 decreases. In general, as the rigidity of the tread surface decreases, so does the edge effect, and the traction performance also decreases. By forming the second concavity 24 in the protrusion 21, however, the perimeter of the opening 24o of the second concavity 24 achieves an edge effect. Therefore, the edge effect is guaranteed even when the second concavity 24 is provided, and traction performance is maintained.

In order to achieve the above-described maintenance of traction performance and the effect of improving control performance, the area $S_3$ of the tread surface of the protrusion 21 (the region with diagonal lines extending to the lower right in FIG. 5) is preferably greater than the area $S_4$ of the base of the second concavity 24 (the region with diagonal lines extending to the upper right in FIG. 5). The area $S_4$ of the base of the second concavity 24 is further preferably 10% to 30% of the area of the upper surface of the protrusion 21 (the area of the region surrounded by the outer perimeter of the protrusion 21, i.e. $S_3+S_4$).

In this embodiment, as illustrated in FIGS. 1, 4, and 5, the first concavity 23 is formed between the protrusion 21 and the block peripheral portion 20s, adjacent to the protrusion 21. As a result, an edge effect can be achieved at the inner perimeter of the block peripheral portion 20s, improving the traction performance. Furthermore, the protrusion 21 moves more easily and follows the shape of the road better, thereby improving the ground contact performance and the control performance.

By not providing the second concavity in the block row (center block row) 10a to 10e that is closest to the tire equatorial plane CL as in this embodiment, sufficient block rigidity can be guaranteed in the center block row, where the greatest tire circumferential direction input is applied. Furthermore, by providing the second concavity 24 in blocks distant from the tire equatorial plane CL (in this embodiment, the intermediate block row 20a to 20d), the traction performance can be improved not only when driving in a straight line but also when turning.

As illustrated in FIG. 5, in plan view of the tread, the perimeter of the tread surface of the protrusion 21 is preferably shaped as a polygon (a rectangle in FIG. 5) having sides 21a extending in the tire width direction and sides 21b extending in the tire circumferential direction. In plan view of the tread, the perimeter of the opening of the second concavity 24 is preferably shaped as a polygon (a rectangle in FIG. 5) having sides 24a extending in the tire width direction and sides 24b extending in the tire circumferential direction.

By thus forming the tread surface of the protrusion 21 and/or the perimeter of the opening of the second concavity 24 to be a polygon in plan view of the tread, the edge effect can be improved. Providing these perimeters with sides extending in the tire width direction improves traction performance when driving in a straight line. Furthermore, providing these perimeters with sides extending in the tire circumferential direction improves traction performance when turning.

In the tire of this embodiment, as illustrated in FIGS. 4 and 5, the stepped portion 22 is formed on the side of the protrusion 21 in the third intermediate block 20c. As a result, after wear of the edges of the protrusion 21 has progressed, the edges of the stepped portion 22 achieve a new edge effect, thereby allowing for high traction performance to be maintained over an extended period of time.

From the perspective of guaranteeing sufficient rigidity of the protrusion 21, obtaining a sufficient edge effect, and guaranteeing traction performance, and from the perspective of preventing the protrusion 21 from breaking off when the tire is used, the height f of the tread surface of the protrusion 21 in the tire radial direction from the tread surface of the block peripheral portion 20s is preferably less than the height g in the tire radial direction from the base of the first concavity 23 to the tread surface of the block peripheral portion 20s, and the height of the protrusion 21 is preferably set to an appropriate value. If the height f of the tread surface of the protrusion 21 in the tire radial direction from the tread surface of the block peripheral portion 20s is equal to or greater than the height g in the tire radial direction from the base of the first concavity 23 to the tread surface of the block peripheral portion 20s, the rigidity of the protrusion 21 diminishes significantly, which might prevent sufficient traction performance from being obtained.

From the same perspectives, the depth e of the second concavity 24 in the tire radial direction is preferably 85% or less of the height h in the tire radial direction from the base of the first concavity 23 to the tread surface of the protrusion 21.

From the perspective of improving control performance by sufficiently decreasing rigidity of the portion that projects out more than the block peripheral portion 20s in the protrusion 21, i.e. the portion that is strongly related to ground contact performance, the second concavity 24 is preferably made sufficiently deep by setting the depth e of the second concavity 24 in the tire radial direction to be equal to or greater than the height f of the tread surface of the protrusion 21 in the tire radial direction from the tread surface of the block peripheral portion 20s.

The tread is preferably formed from rubber having a JIS A hardness of 55 or greater. In this case, the edge effect of the block can be increased, improving traction performance, and the wear resistance of the block can be improved.

In the tire of this embodiment, by forming the stepped portion on the side of the protrusion and/or forming the second concavity on the tread surface of the protrusion, the tread surface of the block is allowed to move easily, improving ground contact performance. Therefore, sufficient ground contact performance can be guaranteed even when using hard rubber in the tread.

The tread is also preferably formed from rubber having a JIS A hardness of 80 or less. If the JIS A hardness of the rubber is larger than 80, the ground contact performance might decrease.

EXAMPLES

Example 1

Bias tires and radial tires were prepared, and the traction performance was evaluated when the tire was new and after tire wear, as described below.

The sizes of the prepared bias tires were 120/80-19 and 110/90-19, and these tires had a two-layer nylon carcass ply and a one-layer nylon breaker.

The sizes of the prepared radial tires were 120/80R19 and 110/90R19, and these tires had a two-layer nylon carcass ply and a one-layer Kevlar belt.

Using these bias tires and radial tires, the below-described Example Tires 1 and 2 and Comparative Example Tires 1 and 2 were prepared.

The Example Tires 1 and 2 are provided with the tread pattern illustrated in FIGS. 1 to 3, a protrusion is formed on each block, and a stepped portion is formed on the side of each protrusion. A first concavity is formed adjacent to the protrusion in each block. In plan view of the tread, the perimeter of the tread surface of the protrusion and the perimeter of the stepped portion in each of the center blocks and intermediate blocks are shaped as a rectangle having sides extending in the tire width direction and sides extending in the tire circumferential direction. The height of the tread surface of the protrusion in each block is greater than the height of the tread surface of the block peripheral portion. The height of the stepped portion of the protrusion in each block is less than the height of the tread surface of the block peripheral portion. Furthermore, the JIS A hardness of the rubber forming the tread is 55.

Example Tire 2 has a similar structure to that of the Example Tire, except that the height of the stepped portion is equal to or greater than the height of the block peripheral portion.

In Comparative Example Tire 1, a concavity is formed in the center of the tread surface of each block. In plan view of the tread, the perimeter of the concavity is shaped as a rectangle having sides extending in the tire width direction and sides extending in the tire circumferential direction. A stepped portion is not formed on the side of the concavity. Furthermore, a protrusion is not formed in each block. Other than these points, Comparative Example Tire 2 is the same as Example Tire 1.

In Comparative Example Tire 2, a similar first concavity and a similar protrusion as in Example Tire 1 are formed on the tread surface of each block, but a stepped portion is not formed on the side of the protrusion. Other than these points, Comparative Example Tire 1 is the same as Example Tire 1.

Evaluation was made by mounting each of the prepared tires on a motorcycle, having a professional motocross rider drive the motorcycle 100 km on a motocross competition course, and having the rider provide a sensory assessment, on a 10-point scale, of the traction performance when driving in a straight line and when turning both initially (new tire) and after wear.

The results of the evaluation indicated no difference between bias tires and radial tires for both the Example Tires 1 and 2 and the Comparative Example Tires 1 and 2. Table 1 lists the results.

TABLE 1

| | First concavity | Protrusion | Height of tread surface of protrusion | Stepped portion | Height of stepped portion | Initial traction performance | Traction performance after wear |
|---|---|---|---|---|---|---|---|
| Example Tire 1 (bias, radial) | provided | provided | greater than height of tread surface of block peripheral portion | provided | less than height of tread surface of block peripheral portion | 9 | 8 |
| Example Tire 2 (bias, radial) | provided | provided | greater than height of tread surface of block peripheral portion | provided | equal to or greater than height of tread surface of block peripheral portion | 9 | 7 |
| Comparative Example Tire 1 (bias, radial) | not provided (concavity provided in center of block tread surface) | not provided | | not provided | | 7 | 4 |
| Comparative Example Tire 2 (bias, radial) | not provided | provided | greater than height of tread surface of block peripheral portion | not provided | | 9 | 5 |

The results listed in Table 1 show that as compared to Comparative Example Tires 1 and 2, Example Tires 1 and 2 achieve equal or better initial traction performance and have greatly improved traction performance after wear. It is also clear that Example Tire 1, in which the height of the stepped portion is lower than the height of the tread surface of the block peripheral portion, has better traction performance after wear than Example Tire 2, in which the height of the stepped portion is equal to or greater than the height of the tread surface of the block peripheral portion.

Example 2

Bias tires and radial tires were prepared, and the traction performance and control performance were evaluated, as described below.

The sizes of the prepared bias tires were 120/80-19 and 110/90-19, and these tires had a two-layer nylon carcass ply and a one-layer nylon breaker.

The sizes of the prepared radial tires were 120/80R19 and 110/90R19, and these tires had a two-layer nylon carcass ply and a one-layer Kevlar belt.

Using these bias tires and radial tires, the below-described Example Tires 1 and 2 and Comparative Example Tires 1 and 2 were prepared.

The Example Tire 1 is provided with the tread pattern illustrated in FIGS. 1, 4, and 5, a protrusion is formed on each block, and a second concavity is formed on the tread surface of each protrusion in the intermediate blocks. A first concavity is formed adjacent to the protrusion in each block. The height of the tread surface of the protrusion in each block is greater than the height of the tread surface of the block peripheral portion. In each block, the height f of the tread surface of the protrusion in the tire radial direction from the tread surface of the block peripheral portion is less than the height g in the tire radial direction from the base of the first concavity to the tread surface of the block peripheral portion. The perimeter of the tread surface of the protrusion and the perimeter of the opening of the second concavity in each of the intermediate blocks are, in plan view of the tread, substantially shaped as a rectangle having sides extending in the tire width direction and sides extending in the tire circumferential direction. In the intermediate blocks, the area of the tread surface of the protrusion is greater than the area of the opening of the second concavity. In the intermediate blocks, the depth e of the second concavity in the tire radial direction is equal to or greater than the height f of the tread surface of the protrusion in the tire radial direction from the tread surface of the block peripheral portion. Furthermore, the JIS A hardness of the rubber forming the tread is 55.

Example Tire 2 is the same as Example Tire 1, except that the first concavity formed in Example Tire 1 is not formed, but rather the block peripheral portion encompasses the portion where the first concavity is formed in Example Tire 1.

In Comparative Example Tire 1, a concavity is formed in the center of the tread surface of each block. In plan view of the tread, the perimeter of the concavity is shaped as a rectangle having sides extending in the tire width direction and sides extending in the tire circumferential direction. A second concavity is not formed. Other than these points, Comparative Example Tire 1 is the same as Example Tire 1.

In Comparative Example Tire 2, a similar first concavity and a similar protrusion as in Example Tire 1 are formed on the tread surface of each block, but a second concavity is not formed on the tread surface of the protrusion. Other than these points, Comparative Example Tire 2 is the same as Example Tire 1.

Evaluation was made by mounting each of the prepared tires on a motorcycle, having a professional motocross rider drive the motorcycle on a motocross competition course, and having the rider provide a sensory assessment, on a 10-point scale, of the traction performance and control performance.

The results of the evaluation indicated that no difference between bias tires and radial tires for both the Example Tires 1 and 2 and the Comparative Example Tires 1 and 2, nor was any difference observed when changing the tire size. Table 2 lists the results.

TABLE 2

| | Protrusion | Height of tread surface of protrusion | First concavity | Second concavity | Traction performance | Control performance |
|---|---|---|---|---|---|---|
| Example Tire 1 (bias, radial) | provided | greater than height of tread surface of block peripheral portion | provided | provided | 8 | 9 |

TABLE 2-continued

|  | Protrusion | Height of tread surface of protrusion | First concavity | Second concavity | Traction performance | Control performance |
|---|---|---|---|---|---|---|
| Example Tire 2 (bias, radial) | provided | greater than height of tread surface of block peripheral portion | not provided | provided | 8 | 8 |
| Comparative Example Tire 1 (bias, radial) | not provided |  | not provided (concavity provided in center of block tread surface) | not provided | 5 | 5 |
| Comparative Example Tire 2 (bias, radial) | provided | greater than height of tread surface of block peripheral portion | provided | not provided | 7 | 7 |

The results listed in Table 2 show that as compared to Comparative Example Tires 1 and 2, both the traction performance and the control performance are greatly improved in Example Tires 1 and 2.

It is also clear that Example Tire 1, in which the first concavity is formed at a position adjacent to the protrusion, has even better control performance than Example Tire 2, in which the first concavity is not formed.

REFERENCE SIGNS LIST 10a-10e First to fifth center blocks
10s Block peripheral portion of center block
11 Protrusion of center block
12 Stepped portion of center block
13 First concavity of center block
19 Shallow groove of center block
20a-20d First to fourth intermediate blocks
21 Protrusion of intermediate block
22 Stepped portion of intermediate block
23 First concavity of intermediate block
24 Second concavity of intermediate block
20s Block peripheral portion of intermediate block
30a-30e First to fifth shoulder blocks
31 Protrusion of shoulder block
33 First concavity of shoulder block
30s Block peripheral portion of shoulder block
a Height of tread surface of block peripheral portion
b Height of tread surface of protrusion
c Height of stepped portion
d Height from stepped portion to tread surface of protrusion
e Depth of second concavity in tire radial direction
f Height of tread surface of protrusion in tire radial direction
from tread surface of block peripheral portion
g Height in tire radial direction from base of first concavity to
tread surface of block peripheral portion
h Height in tire radial direction from base of first concavity to
tread surface of protrusion
CL Tire equatorial plane

The invention claimed is:

1. A tire comprising:
a tread with a plurality of blocks formed thereon;
a protrusion extending outward in a tire radial direction and formed on more than one block among the plurality of blocks;
a stepped portion formed on a side of the protrusion;
a first concavity formed around the stepped portion; and
a block peripheral portion formed around the first concavity,
wherein in plan view of the tread, a perimeter of a tread surface of the protrusion is shaped as a polygon having at least one side extending in a tire width direction and one side extending in a tire circumferential direction, and
wherein the height of the stepped portion is equal or greater than the height of the block peripheral portion.

2. The tire of claim 1, wherein the area of an upper surface of the stepped portion is less than the area of a tread surface of the protrusion.

3. The tire of claim 1, further comprising
a second concavity formed on a tread surface of the protrusion.

4. The tire of claim 3, wherein a height of the tread surface of the protrusion in the tire radial direction from a tread surface of a block peripheral portion is less than a height in the tire radial direction from a base of the first concavity to the tread surface of the block peripheral portion.

5. The tire of claim 3, wherein in plan view of the tread, a perimeter of an opening of the second concavity is shaped as a polygon having at least one side extending in a tire width direction and one side extending in a tire circumferential direction.

6. The tire of claim 3, wherein the area of a tread surface of the protrusion is greater than the area of a base of the second concavity.

7. The tire of claim 3, wherein a depth of the second concavity in the tire radial direction is equal to or greater than a height of the tread surface of the protrusion in the tire radial direction from a tread surface of a block peripheral portion.

8. The tire of claim 1, wherein the tread is formed from rubber having a JIS A hardness of 55 or greater.

9. The tire of claim 3, wherein the tread is formed from rubber having a JIS A hardness of 55 or greater.

* * * * *